United States Patent [19]

Riedel et al.

[11] 4,334,459
[45] Jun. 15, 1982

[54] MECHANICALLY CONTROLLED VACUUM BOOSTER

[75] Inventors: Peter Riedel, Hattersheim; Lucas H. Haar, Niddatal, both of Fed. Rep. of Germany

[73] Assignee: ITT Industries, Inc., New York, N.Y.

[21] Appl. No.: 143,384

[22] Filed: Apr. 24, 1980

[30] Foreign Application Priority Data

May 10, 1979 [DE] Fed. Rep. of Germany ....... 2918909

[51] Int. Cl.³ .............................. F15B 9/10; F16J 3/02
[52] U.S. Cl. ..................................... 91/369 B; 60/554; 92/166; 92/99
[58] Field of Search .............. 91/369 B, 369 A, 369 R, 91/376 R; 92/165 R, 165 PR, 166, 99; 60/554

[56] References Cited

U.S. PATENT DOCUMENTS 4,100,839 7/1978 Ando ................................. 91/369 B
4,270,353 6/1981 Thomas et al. .................... 91/369 A

FOREIGN PATENT DOCUMENTS 2922299 12/1979 Fed. Rep. of Germany ... 91/369 A
2040376 3/1980 United Kingdom ............. 91/369 A Primary Examiner—Paul E. Maslousky
Attorney, Agent, or Firm—John T. O'Halloran; Alfred C. Hill

[57] ABSTRACT

A light weight brake booster is disclosed having an internal axial tube for transmitting axial forces with a working or boosting piston surrounding the tube and a control piston slideably guide inside the tube. These two pistons are connected by reaction levers extending through longitudinal slots in the tube. The reaction levers are pivotably supported to transmit boosting forces to a master brake cylinder and their inner ends engage the control piston to deliver a reaction force to the brake pedal to give the driver the required "brake feel".

11 Claims, 1 Drawing Figure

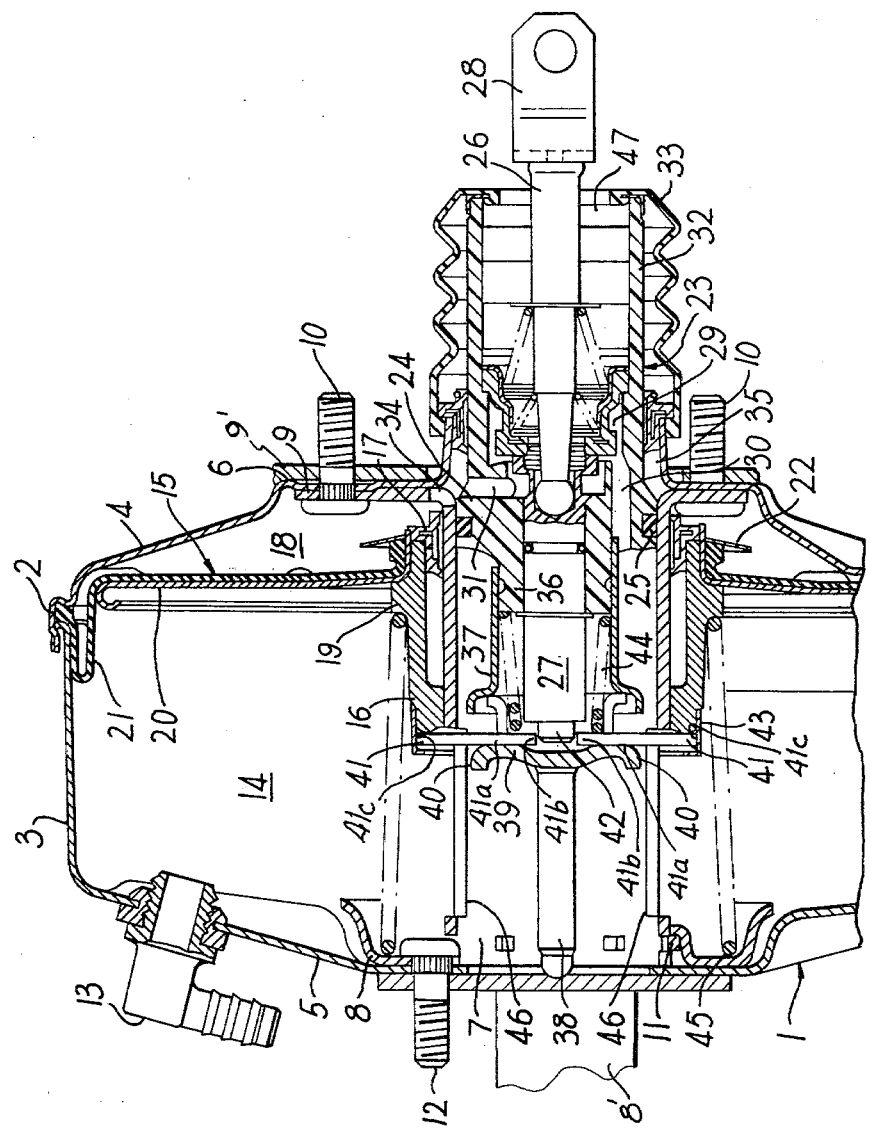

MECHANICALLY CONTROLLED VACUUM BOOSTER

BACKGROUND OF THE INVENTION

The present invention relates to a mechanically controlled vacuum booster, in particular for brake systems of motor vehicles, comprising a pressure housing which can be fastened at one end wall to a carrier or support wall and at the other end wall to a force receiving device, such as a master brake cylinder. At least one movable wall is disposed in the pressure housing and a tube sealingly penetrates the movable wall and is connected to both end walls of the pressure housing. The movable wall subdivides the pressure housing into a low pressure or vacuum chamber and a working chamber and acts, via connecting elements projecting through slots in the tube and a reaction device, on a pressure bar disposed in the interior of the tube and extending to the force receiving device. A control housing subdivides the hollow chamber of the tube into two working chambers and the control housing contains a pressure controlling valve operated by a control bar which can be brought into operative connection with the reaction device.

A booster of this type is described in copending U.S. patent application Ser. No. 061,113, filed July 26, 1979, assigned to the same assignee as the present application, whose disclosure is incorporated herein by reference. This booster operates to boost the brake force in a motor vehicle and is activated by the difference in pressure between a vacuum produced by the motor and the atmospheric pressure. The importance of brake boosters of this type is in particular due to their considerably smaller weight with equal efficiency. This reduction in weight is achieved by the connection of the two end walls of the pressure housing by means of a central tube which receives the operating forces transmitted through the booster and applied to the central bar and part of the pressure forces acting the walls of the pressure housing, so that the pressure housing can have thin walls and a low weight. The saving of weight is, however, achieved by greater constructional expenditures, since additional sealings are necessary and additional means must be provided to transmit the boosting force produced at the movable wall to the pressure bar arranged in the interior of the tube.

In the brake booster according to the above-cited copending application cross elements, which can be fastened with screws, are provided at the movable wall to transmit the boosting force produced at the movable wall to the pressure bar. The cross elements project through slots in the tube and engage the grooves or clearances in the control housing. From the control housing the boosting force is transmitted to the pressure bar via a reaction device arranged in the control housing. This type of construction is relatively expensive and requires a great tube diameter.

From U.S. Pat. No. 3,102,453, issued Sept. 3, 1963, a brake booster is known, in which reaction levers are provided for the transmission of a reaction force to the control bar connected to the brake pedal. These levers have their outer end abutting against the movable wall, their inner end abutting against the control piston and their intermediate area abutting against the pressure bar. In this known brake booster the mounting of a tube to connect the end walls of the pressure housing is not disclosed.

SUMMARY OF THE INVENTION

An object of the present invention is to further simplify a booster of the type disclosed in the above-identified copending application with regard to its construction and to improve its operation.

A feature of the present invention is the provision of a mechanically controlled vacuum booster comprising: a low pressure housing having a longitudinal axis, one end wall for mounting the booster to a support wall and the other end wall for mounting a force receiving device to the booster; a tube disposed in the pressure housing coaxial of the axis interconnecting both the end walls of the pressure housing, the tube having longitudinal slots therein adjacent the other end wall; a movable wall disposed in the pressure housing coaxial of the axis slideably sealed to the outer surface of the tube and dividing the pressure housing into a working chamber and a vacuum chamber, the movable wall acting, via connecting members projecting through the slots, on a pressure bar disposed in the interior of the tube extending to the force receiving device; a control housing disposed coaxial of the axis in a slideably sealed relationship with the interior surface of the tube, the control housing containing therein a pressure controlling valve operable by a control bar in an operative relation with the connecting members; and the connecting members including reaction levers having one surface facing the one end wall of the pressure housing and the other surface facing the other end wall of the pressure housing, the radially outer end of the one surface of the levers abutting the movable wall, the radially inner end of the one surface of the levers abutting the control bar and the intermediate area of the other surface of the levers between the inner and outer ends thereof abutting the pressure bar.

Hereby a combination of the reaction device and the connecting members in the form of reaction levers is achieved so that the construction of the booster is considerably simplified. Furthermore, the boosting force is directly transmitted to the pressure bar via the reaction levers. The advantage of this is that the control housing remains unloaded and can be produced of a light material meeting the low strength requirements. For instance, the control housing can be made of a thermoplast.

In a preferred embodiment of the present invention the reaction levers abut against an end of the movable wall facing the pressure bar and extending from the surface of the movable wall disposed in the vacuum chamber. Hereby, the construction and primarily the assembly of the booster are simplified. For radially securing their position the reaction levers can advantageously have their inner ends abut against a plug secured to the control bar and their outer ends abut against a ring fastened to the movable wall. Furthermore, it is appropriate that the reaction levers engage slots in the pressure bar, or in the control housing to thereby secure the pressure bar and the control housing against rotation easily.

According to another advantageous construction of the present invention the inner ends of the reaction levers are bent towards the control housing. Hereby, the overall length of the control housing is reduced so that additional space is created for installation of the end of the master brake cylinder within the pressure housing of the booster. The reaction levers may advantageously also be double bent in such a way that their radial inner ends are displaced parallel to their outer ends towards the control housing. The gained installation space for the master brake cylinder is even larger with such a construction of the reaction levers.

The guiding of the movable wall is advantageously effected on the outer surface of the tube. Independent of the movable wall, the control housing is advantageously like a piston slideably guided in the bore of the tube and is sealed against the tube by means of seals.

A further simplification of the booster according to the present invention is achieved in that the pressure bar is rigidly connected to the control housing. In this way the pressure bar forms a stable unit with the control housing guided in the tube so that a buckling of the pressure bar under load is avoided. Furthermore, the pressure bar is guided by the control housing so that no additional guiding surfaces are needed. The end of the pressure bar adjacent the reaction levers may advantageously carry a bell shaped portion with its open end facing the control housing. Tonques are sheared out of the bell shaped portion and bent radially to the outside which form the contact surface for the reaction levers. The end of the pressure bar receiving the boosting force can in this way be produced simply as a sheet form part and at the same time forms a guide for the reaction levers.

The rigid connection of the pressure bar to the control housing is advantageously achieved by the edge of the bell shaped portion being connected to the cylindrical shoulder of the control housing by a sleeve. The pressure bar and control housing may also be produced in one piece and have a cross slot for receiving the reaction levers. For instance, the control housing and pressure bar could be cast out of aluminum in one piece.

To delay the response of the reaction device in the booster according to this invention and to acheive thereby a "jumping start" a pressure spring surrounding the control bar is inserted between the adjacent end of the control housing and the radially inner end of the reaction levers. The pressure spring presses the reaction levers against the pressure bar. The response of the reaction levers may also advantageously be delayed by a spring supported by the movable wall which presses the ends of the reaction levers extended beyond the outer supporting spot at the movable wall in the direction of release to a contact surface at the movable wall. Such an arrangement of the spring is, for instance, appropriate when control housing and pressure bar are made of one piece.

The movable wall is preferably formed by a plate supporting a rolling diaphragm fixed in the pressure housing. The radially inner flanged edge of the plate is shifted on a gliding sleeve or sliding casing which is guided on the tube. The sealing of the gliding sleeve is advantageously effected by an elastic gliding guiding ring which also forms one of the gliding bearings of the gliding sleeve.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a brake booster in accordance with the principles of the present invention with the lower half of the pressure housing being omitted.

DESCRIPTION OF THE PREFERRED EMBODIMENT

The embodiment shown in the FIGURE is a brake booster for motor vehicles which utilizes the difference in pressure between a partial vacuum and the atmospheric pressure.

The pressure housing 1 of the brake booster includes two housing parts 3 and 4 connected to one another at a connection point 2, the ends of housing parts 3 and 4 forming the end walls 5 and 6, respectively, of pressure housing 1. In pressure housing 1 a tube 7 is disposed coaxially of the longitudinal axis of housing 1. Tube 7 supports at its ends flanges 8 and 9. Flange 9 is connected to end wall 6 and has stay bolts 10 which serve for fixing the brake booster to a carrier wall 9' of a motor vehicle. Flange 8 which is connected to tube 7 by indentations 11 during the assembly of the device carries stay bolts 12 connecting tube 7 with end wall 5 of housing part 3 and serving to fasten a master brake cylinder 8' to the brake booster.

The interior chamber of pressure housing 1 is subdivided by a movable wall into a low pressure chamber 14 connected to a vacuum source by means of a connecting sleeve 13 and a working chamber 18. Outside tube 7 the movable wall includes a working piston 15 having a gliding sleeve or sliding casing 19, a diaphragm plate 20 and a rolling diaphragm 21.

Sliding casing 19 is guided on the circumference of tube 7 with an edge 16 and a sliding guiding ring 17 which seals sliding casing 19 to the circumference of tube 7 and to diaphragm plate 20. Rolling diaphragm 21 is inserted at connection point 2 and with its inner enlargement fixed to diaphragm plate 20 by a clamping ring 22. In the interior of tube 7 the movable wall includes a control housing 23 having an enlarged edge 24 guided in the manner of a piston in the bore of tube 7 and is sealed thereto by a sealing ring 25. A control bar including tappet bar 26 and control piston 27 is axially shiftably disposed in the interior of control housing 23. The control bar is connected to the brake pedal (not shown) of the motor vehicle by means of a yoke 28. Control housing 23 contains additionally a control valve 29 operated by control piston 27 and controlling via channels 30 and 31 the difference in pressure between low pressure chamber 14 and working chamber 18 in a known manner. The neck 32 of control housing 23 is also guided and sealed in end wall 6 of pressure housing 1 by a sliding guiding ring. A protecting cap 33 avoids the contamination of its surface. Openings 34 in tube 7 connect working chamber 18, the ring chamber 35 on the side of working chamber 18 inside tube 7 and channel 31 to one another.

At its end remote from tappet bar 26 control housing 23 has a cylindrical shoulder 36 carrying a cylindrical sleeve 37, at the free end of which a bell shaped portion 39 of a pressure bar 38 serving for operation of the master cylinder is fixed. Tongues 40 are sheared out of the edge of bell shaped portion 39 against which reaction levers 41 abut with their intermediate area 41a. Reaction levers 41 project through the slots formed by the shearing of tongues 40 in the edge of bell shaped portion 39 and abut against a plug 42 of control piston 27 with their radial inner ends 41b. The radially outer ends 41c of reaction levers 41 are held in an axial and radial direction by a holding ring 43 fastened to gliding sleeve 19 and are supported by the adjacent end of gliding sleeve 19. A pressure spring 44 disposed in the interior of sleeve 37 keeps reaction levers 41 abutting against tongues 40 and delays the abutting of reaction levers 41 against the adjacent end of control piston 27 during operation of the brake booster. Sleeve 37 is held at the control housing 23 by means of indentations projecting into a ring groove of shoulder 36. Sleeve 37 is connected to the edge of bell shaped portion 39 by tongues bent over at the end of sleeve 37. In this way control housing 23, sleeve 37 and pressure bar 38 with its bell shaped portion 39 form a rigid unit.

For returning the movable wall to its rest position after a boosting operation a return spring 45 is provided which is inserted between flange 8 and gliding sleeve 19.

Reaction levers 41 project through slots 46 in tube 7. Since reaction levers 41 abut against the lateral surfaces of slots 46 and the slots in bell shaped portion 39 with their front edges, these slots provide a safeguard against rotation of control housing 23 and pressure bar 38.

The operation of the brake booster just described will now be described.

The brake booster according to the present invention is shown in its rest position in the FIGURE. By control valve 29 low pressure chamber 14 and working chamber 18 are connected to one another via channels 30 and 31 and are connected to a vacuum source via connecting sleeve 13. By operation of the brake pedal tappet bar 26 and control piston 27 are shifted to the left and the connection between channels 30 and 31 is interrupted, so that low pressure chamber 14 is separated from working chamber 18. Subsequently, channel 31 is connected to the atmosphere through the inlet opening 47 formed by the neck 32, so that the pressure in working chamber 18 increases and starts shifting working piston 15 in the direction of the master brake cylinder. This movement of working piston 15 is transmitted to pressure bar 38 via reaction levers 41, for operating the master cylinder piston. At the same time control housing 23 connected to pressure bar 38 is moved.

In this position of control valve 29 there remains a gap between the front side of control piston 27 and the radial inner ends of reaction levers 41. Therefore, no force is transmitted from reaction levers 41 to control piston 27 and hence, to the brake pedal. This initial operating stroke of the brake booster, thus, is effected alone by switching over of control valve 29 wherein only the valve operating forces have to be overcome. Working piston 15 then jumps, operated by the pressure medium, without direct control by the brake pedal into this operating position, which is desirable in practice to make a short time parking, e.g. at a traffic light, with the lowest foot force possible for the driver.

When with continued operation of tappet bar 26 by the brake pedal the pressure in working chamber 18 and, consequently, the force transmitted from the gliding sleeve 19 to reaction levers 41 further increases, the counter force at the radial inner ends of reaction levers 41 exceeds the prestress of spring 44, and reaction levers 41 abut against control piston 27. From this moment, a part of the operating force active at pressure bar 38 is transmitted via control piston 27 and tappet bar 26 to the brake pedal so that the driver can determine the degree of operation of the master cylinder by dosing his foot force. When e.g. the foot force is not further increased by the driver, working piston 15 shifts pressure bar 38 via reaction levers 41 and control housing 23 so far in relation to control piston 27 that control valve 29 interrupts the connection between working chamber 18 and inlet opening 47. Since now a further increase in pressure in working chamber 18 is not possible any more, the brake booster remains in this operating position. If the brake now needs to be released, the driver relieves the brake pedal whereby control piston 27 is shifted by reaction levers 41, so far to the right that control valve 29 again connects low pressure chamber 14 to working chamber 18 and a pressure balance is effected between low pressure chamber 14 and working chamber 18. Return spring 45 now moves working piston 15 and control housing 23 with pressure bar 38 back into its original position illustrated. This operation of return spring 45 is reinforced by the return spring of the master brake cylinder if present. At the same time pressure spring 44 brings reaction levers 41 into engagement with tongues 40. The clearance between the adjacent end of control piston 27 and reaction levers 41 is again achieved by returning springs in control valve 29 which act on tappet bar 26.

While we have described above the principles of our invention in connection with specific apparatus it is to be clearly understood that this description is made only by way of example and not as a limitation to the scope of our invention as set forth in the objects thereof and in the accompanying claims.

We claim:

1. A mechanically controlled vacuum booster comprising:

a low pressure housing having a longitudinal axis, one end wall for mounting said booster to a support wall and the other end wall for mounting a force receiving device to said booster;

a tube disposed in said pressure housing coaxial of said axis interconnecting both said end walls of said pressure housing, said tube having longitudinal slots therein adjacent said other end wall;

a movable wall disposed in said pressure housing coaxial of said axis slidably sealed to the outer surface of said tube and dividing said pressure housing into a working chamber and a vacuum chamber, said moveable wall acting, via connecting members projecting through said slots, on a pressure bar disposed in the interior of said tube extending to said force receiving device;

a control housing disposed coaxial of said axis in a slidably sealed relationship with the interior surface of said tube, said control housing containing therein a pressure controlling valve operable by a control bar normally spaced from said pressure bar and in an operative relation with said connecting members; and said connecting members being only reaction levers having one surface facing said one end wall of said pressure housing and the other surface facing said other end wall of said pressure housing, the radially outer end of said one surface of said levers abutting said moveable wall, the radially inner end of said one surface of said levers abutting said control bar and the intermediate area of said other surface of said levers between the inner and outer ends thereof abutting said pressure bar said movable wall including a sliding casing guided on the outer surface of said tube extending parallel to said axis toward said other and wall of said pressure housing, said sliding casing having an end thereon facing said other end wall of said pressure housing, and said radially outer end of said one surface of said levers abut said end of said sliding casing.

2. A booster according to claim 1, wherein the radially inner ends of said levers abut a plug extending from said control bar and said outer ends of said other surface of said levers abut a ring fastened to said sliding casing.

3. A booster according to claim 2, wherein said levers engage slots in a selected one of said pressure bar and said control housing.

4. A booster according to claim 3, wherein said control housing is slideable guided in said tube like a piston and sealed thereto by a sealing ring disposed in the outer surface of said control housing.

5. A booster according to claim 4, wherein said pressure bar is rigidly connected to said control housing.

6. A booster according to claim 5, wherein the end of said pressure bar adjacent said control housing carries a bell shaped portion thereon having its open end facing said control housing and tongues are sheared out of said bell shaped portion and bent radially outward to abut said levers in the intermediate area of said other surface of said levers.

7. A booster according to claim 6, wherein the edge of said bell shaped portion is connected to a cylindrical shoulder of said control housing by means of a sleeve.

8. A booster according to claim 5, wherein said pressure bar and said control housing are an integral unit having said slots for receiving said levers.

9. A booster according to claim 5, further including a pressure spring disposed about said control bar and between said levers adjacent the radially inner end of said one surface of said levers and an adjacent end of said control housing to press said levers against said pressure bar.

10. A booster according to claim 1, wherein said movable wall further includes a diaphragm plate carrying a rolling diaphragm having an outer edge fastened to said pressure housing, said diaphragm plate having its inner edge carried by said casing, said rolling diaphragm having its inner edge sealed to said sliding casing.

11. A booster according to claim 10, wherein said sliding casing is slidably sealed to the outer surface of said tube by an elastic sliding guiding ring.

* * * * *